(12) United States Patent
Stergiou et al.

(10) Patent No.: US 10,269,034 B2
(45) Date of Patent: Apr. 23, 2019

(54) CONTENT GUIDED TECHNIQUES FOR USE IN NATIVE ADVERTISEMENT PLACEMENT

(71) Applicant: Yahoo! Inc., Sunnyvale, CA (US)

(72) Inventors: Stergios Stergiou, East Palo Alto, CA (US); Herve Marcellini, Menlo Park, CA (US)

(73) Assignee: Excalibur IP, LLC, New York, NY (US)

( * ) Notice: Subject to any disclaimer, the term of this patent is extended or adjusted under 35 U.S.C. 154(b) by 0 days.

(21) Appl. No.: 14/252,501

(22) Filed: Apr. 14, 2014

(65) Prior Publication Data

US 2015/0278387 A1     Oct. 1, 2015

Related U.S. Application Data

(60) Provisional application No. 61/970,503, filed on Mar. 26, 2014.

(51) Int. Cl.
  *G06F 17/22* (2006.01)
  *G06Q 30/02* (2012.01)
  *G06F 3/00* (2006.01)

(52) U.S. Cl.
  CPC ..... *G06Q 30/0241* (2013.01); *G06Q 30/0277* (2013.01)

(58) Field of Classification Search
  CPC .......... G06F 17/30; G06F 17/00; G06F 17/22; G06F 17/2247; G06F 3/00; G06Q 30/0241; G06Q 30/0277
  USPC ........................ 715/243; 707/661; 705/14.72
  See application file for complete search history.

(56) References Cited

U.S. PATENT DOCUMENTS

| | | | |
|---|---|---|---|
| 6,539,374 B2* | 3/2003 | Jung | G06F 17/30917 |
| 8,805,861 B2 | 8/2014 | Boyan et al. | |
| 9,215,245 B1 | 12/2015 | Rajab et al. | |
| 9,626,699 B2 | 4/2017 | Stergiou et al. | |
| 2002/0044683 A1* | 4/2002 | Deshpande | H04N 5/272 382/165 |

(Continued)

OTHER PUBLICATIONS

"Web Data Management", Abiteboul et al. Copyright 2011, http://webdam.inria.fr/Jorge/.*

(Continued)

*Primary Examiner* — Cesar B Paula
*Assistant Examiner* — Jian Huang
(74) *Attorney, Agent, or Firm* — Mauriel Kapouytian Woods LLP; Serge Krimnus; James Woods

(57) ABSTRACT

Techniques are provided that include obtaining a Document Object Model of an HTML document, such as a web page of a publisher. Elements of the Document object model may be identified that are associated with native advertisement placement candidate containers. Based at least in part on analysis associated with the Document Object Model, and utilizing at least some of the identified elements, one or more native advertisement placement candidate containers may be determined. Some techniques may utilize, in the analysis, identification of one or more secondary source HTML documents associated with a primary HTML document, and may identify, within the secondary source HTML document(s), content associated with native advertisement placement candidate containers of the primary HTML document(s).

40 Claims, 13 Drawing Sheets

(56) References Cited

U.S. PATENT DOCUMENTS

| | | | |
|---|---|---|---|
| 2006/0133666 A1 | 6/2006 | Liu et al. | |
| 2006/0173985 A1* | 8/2006 | Moore | G06F 17/3089 709/223 |
| 2008/0010270 A1* | 1/2008 | Gross | G06F 17/30867 |
| 2008/0139191 A1 | 6/2008 | Melnyk et al. | |
| 2008/0235594 A1* | 9/2008 | Bhumkar | G06F 17/30899 715/738 |
| 2009/0125977 A1 | 5/2009 | Chander et al. | |
| 2009/0254572 A1* | 10/2009 | Redlich | G06Q 10/06 |
| 2009/0288136 A1 | 11/2009 | Chang et al. | |
| 2010/0145762 A1* | 6/2010 | Coladonato | G06Q 30/0241 705/14.4 |
| 2010/0169311 A1 | 7/2010 | Tengli et al. | |
| 2010/0235245 A1* | 9/2010 | Grossman | G06Q 30/02 705/14.73 |
| 2012/0016655 A1 | 1/2012 | Travieso et al. | |
| 2012/0072815 A1* | 3/2012 | Tsai | G06F 17/30867 715/202 |
| 2012/0173346 A1* | 7/2012 | Steelberg | G06Q 30/02 705/14.73 |
| 2013/0246195 A1* | 9/2013 | Berry | G06Q 30/0276 705/14.72 |
| 2014/0164352 A1* | 6/2014 | Denninghoff | H03H 9/02622 707/711 |
| 2014/0208199 A1* | 7/2014 | Peleg | G06Q 30/0277 715/234 |
| 2015/0178786 A1* | 6/2015 | Claessens | G06Q 30/0269 705/14.66 |

OTHER PUBLICATIONS

U.S. Appl. No. 14/252,529, filed Apr. 14, 2014, Stergiou et al.
U.S. Appl. No. 14/252,552, filed Apr. 14, 2014, Stergiou et al.
U.S. Appl. No. 14/585,783, filed Dec. 30, 2014, Stergiou et al.
Jackson, "Introduction to the Internet And WEB Page Design", Project Report for MS Degree of Arts in Professional Communication, Apr. 2009, 201 pages.
U.S. Appl. No. 15/467,945, filed Mar. 23, 2017.
Abiteboul et al., "Web Data Management," http://webadm.inria.fr/, Cambridge University Press 2011, 440 pages.
Moon et al., "An Effective Data Processing Method for Fast Clustering," ICCSA 2008, pp. 335-347.
Jakubczyk, "Source Code Analysis Techniques in Property Verification of Real Java Code," https://pdfs.semanticscholar.org/8418/69a799a8a3a87163de0493c01d8a1a0a64a3.pdf, University of Warsaw, 2013, 212 pages.
Skobeltsyn et al., "Efficient processing of XPath queries with structured overlay networks," 2005 OTM Confederated international conference on On the Move to Meaningful Internet Systems: CoopIS, COA, and ODBASE—vol. Part II, 18 pages.
Crane, "Getting Started with Ajax," DZone, https://dzone.com/refcardz/getting-started-ajax, 14 pages.
Kha et al., "XML Query Processing Using a Schema-Based Numbering Scheme," International XML Database Symposium, XSym 2004, pp. 21-34.

* cited by examiner

US 10,269,034 B2

CONTENT GUIDED TECHNIQUES FOR USE IN NATIVE ADVERTISEMENT PLACEMENT

BACKGROUND

Native advertising, as well as native content generally, is of increasing importance. For example, native advertisements may perform well, yet may be relatively unobtrusive to the user's experience.

SUMMARY

Some embodiments of the invention provide techniques, for example, in connection with native advertisement, or non-advertising content, placement. Some embodiments provide techniques in which native advertisement placement candidate containers, such as HTML containers, are determined. In some embodiments, for example, candidate containers, or some of them, may be used in connection with placement of native advertisements. For example, in some embodiments, candidate containers may be associated with content elements or content items on a web page, and native advertisements may be placed in association with such content, such as, for example, in, with, or near such elements or items.

In some embodiments, a Document Object Model (DOM) of an HTML document, such as a Web page, is utilized. DOM elements associated with native advertisement placement candidate containers are identified. Analysis associated with the DOM, including use of the identified elements, is utilized to determine native advertisement placement candidate containers. In various embodiments, the identified DOM elements may be determined automatically without user input, or with user assistance, such as user selection.

In some embodiments, a native advertisement placement engine may be used in determining native advertisement placement candidate containers. In some embodiments, the engine may utilize a DOM of a secondary source HTML document, such as a RSS feed or Mobile web page, which may be associated with a primary HTML document, such as a web page. Content items may be identified from the secondary source HTML document and used in determining associated or corresponding DOM elements in the web page that may be associated with native advertisement placement candidate containers in the web page.

In some embodiments, a native advertisement placement engine, for example, may use analysis using XML Path Language analysis XPaths. Furthermore, in some embodiments, computation, including use of XPaths, may be used in finding a metacontainer, such as may contain all of the identified DOM elements. Tag whitelisting may also be used in the computation, as described further herein.

In some embodiments, a native advertisement placement engine, for example, may employ techniques that make use of identified frequent markups, or repeating tag sequences, within a DOM of a web page, that correspond to a single DOM element, and may satisfy other conditions. Identified such sequences may be used in determining DOM elements, of the DOM of the web page, associated with native advertisement placement candidate containers, and in determining native advertisement placement candidate containers. For example, in determining the repeating tag sequences, some embodiments employ analysis utilizing computation using a constructed suffix tree composed of web page HTML tags, while some embodiments employ a node flattening technique that may include concatenation of tag names.

In some embodiments, various filtering techniques and criteria may be used, for example, in connection with limiting or pruning a set of native advertisement placement candidate containers. Such filtering may be performed, for example, based on parameters relating to candidate containers or potential candidate containers, or relating to native advertisements to be associated with candidate containers.

While embodiments of the invention are described largely in connection with native advertisement placement, it is to be understood that techniques according to various embodiments of the invention can also be used for other purposes, including native content placement, even if such content is non-advertising content.

Figure 1:
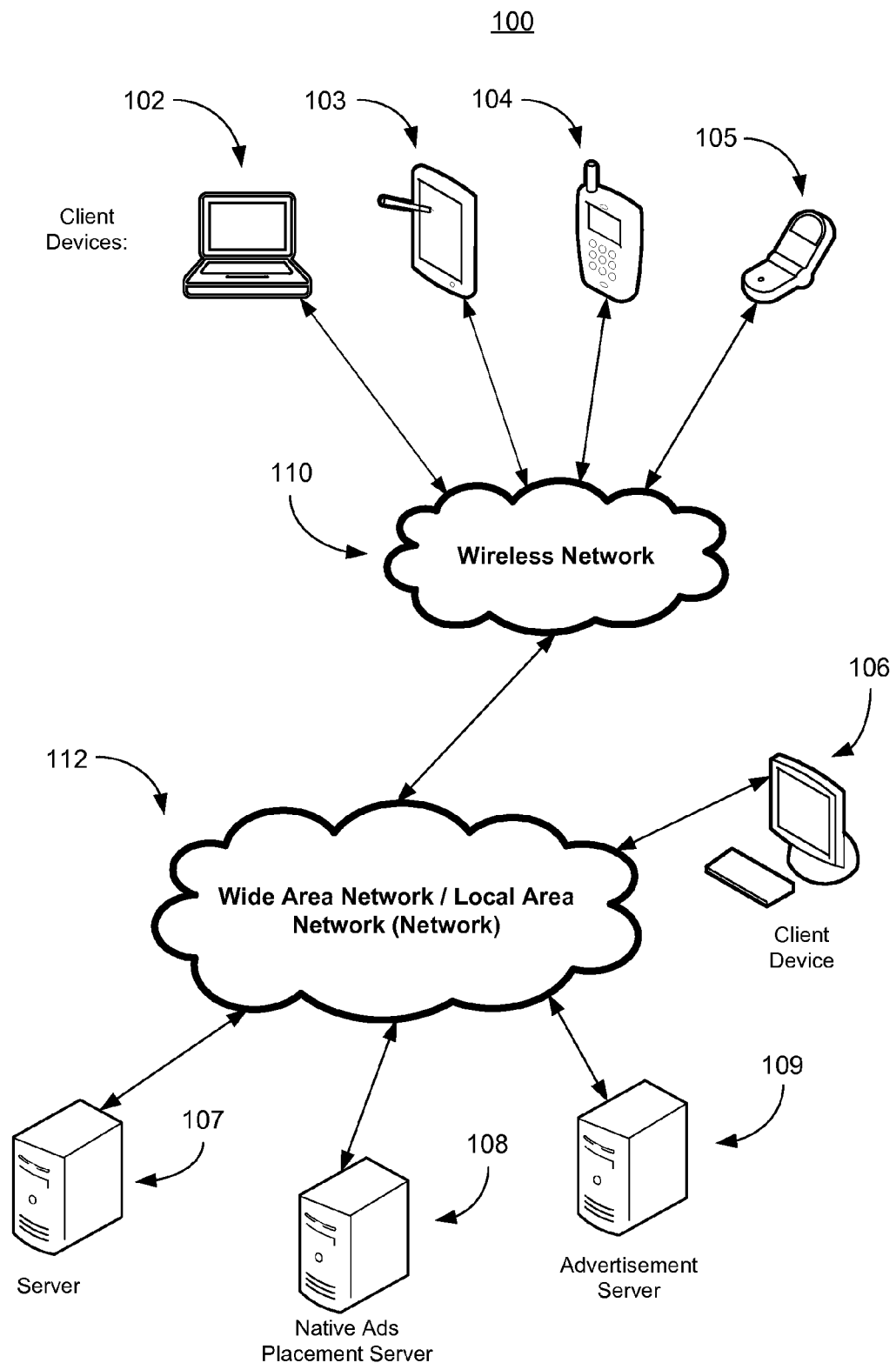
FIG. 1 illustrates a block diagram of a distributed computer system that can implement one or more aspects of a native advertisements placement system or method according to one embodiment of the invention.

While the invention is described with reference to the above drawings, the drawings are intended to be illustrative, and the invention contemplates other embodiments within the spirit of the invention.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" includes plural references. The meaning of "in" includes "in" and "on." Herein, "ad" and "advertisement" are used interchangeably.

It is noted that description herein is not intended as an extensive overview, and as such, concepts may be simplified in the interests of clarity and brevity.

Herein, native ads, native ad placement, and placement, among other terms, are intended to have broad scope. Native ads can be or include, without limitation, any of many different types of advertisements, including all that are described herein, among others. "Placement", as the term is used herein, is intended to have broad scope, covering, and can include, among other things, activities or conduct in connection with obtaining, storing, determining, configuring, selecting, ranking, retrieving, targeting, matching, serving and presenting items, such as advertisements. Furthermore, although embodiments are described largely in connection with native advertisement placement, various embodiments and techniques can be used in other areas, such as, for instance, non-advertising item or content placement, or other areas including non-advertising items or content.

FIG. 1 illustrates components of one embodiment of an environment in which the invention may be practiced. Not all of the components may be required to practice the invention, and variations in the arrangement and type of the components may be made without departing from the spirit or scope of the invention. As shown, the system 100 includes one or more local area networks ("LANs")/wide area networks ("WANs") 112, one or more wireless networks 110, one or more wired or wireless client devices 106, mobile or other wireless client devices 102-106, one or more servers 107, one or more native ads placement servers 108 (or, in other embodiments, native content servers or native non-advertising content servers), such as may include one or more native advertisements placement engines, and one or more advertisement servers 109 (or, in other embodiments, content or non-advertising content servers), and may include or communicate with one or more data stores or databases.

Various of the client devices 102-106 may include, for example, desktop computers, laptop computers, set top boxes, tablets, cell phones, smart phones, etc. The servers 107-109 can include, for example, one or more application servers, content servers, search servers, etc.

An advertisement server can include, for example, a computer server that has a role in connection with online advertising, such as, for example, in obtaining, storing, determining, configuring, selecting, ranking, retrieving, targeting, matching, serving and presenting online advertisements to users, such as on websites, in applications, and other places where users will see them, etc.

Figure 2:
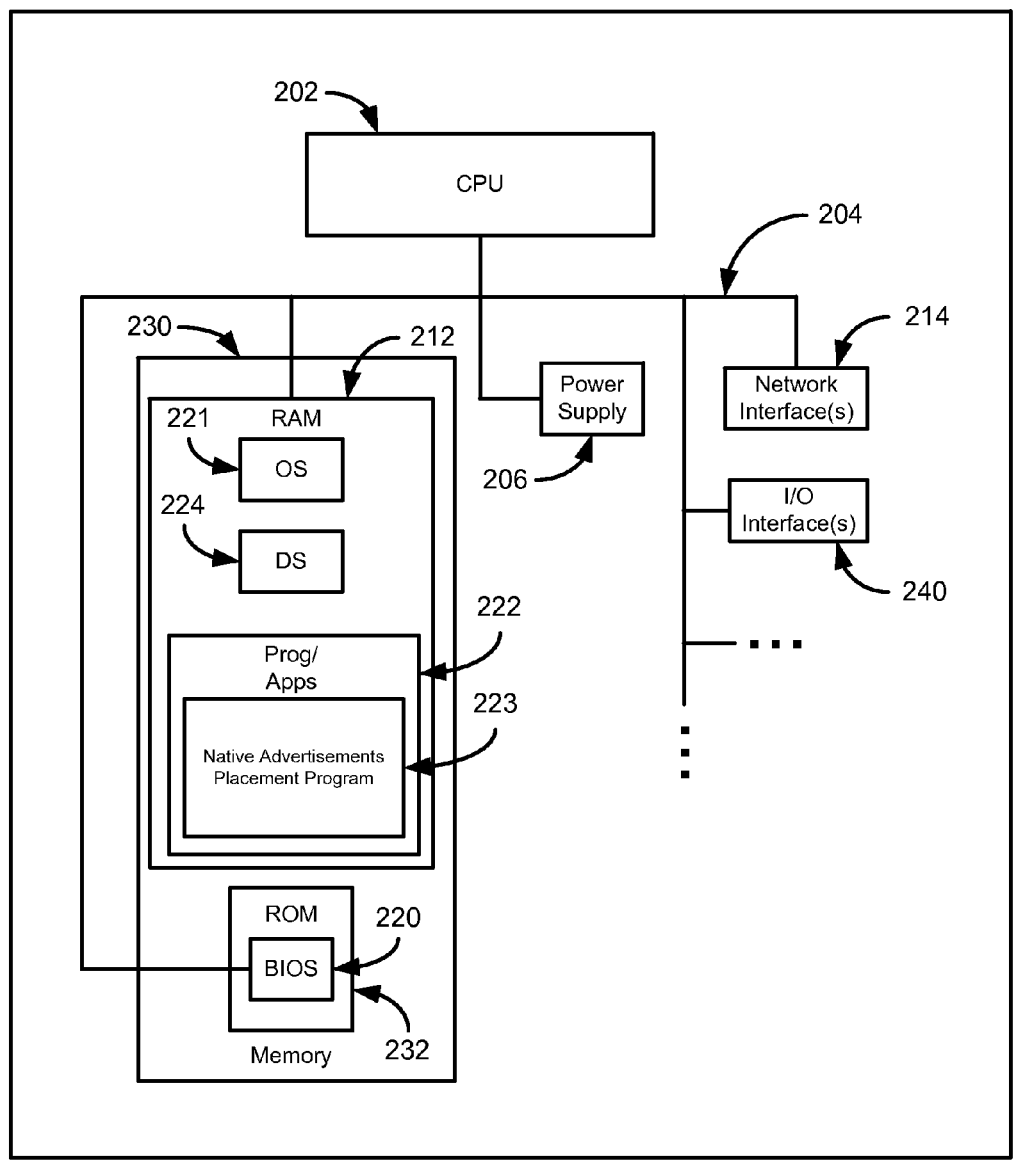
FIG. 2 illustrates a block diagram of an electronic device that can implement one or more aspects of a native advertisements placement system or method according to one embodiment of the invention.

FIG. 2 illustrates a block diagram of an electronic device 200 that can implement one or more aspects of a native advertisements placement system or method according to one embodiment of the invention. Instances of the electronic device 200 may include servers, e.g. servers 107-109, and client devices, e.g. client devices 102-106. In general, the electronic device 200 can include a processor 202, memory 230, a power supply 206, and input/output (I/O) components 240, e.g., microphones, speakers, displays, touchscreens, keyboards, keypads, GPS components, etc., which may be operable, for example, to provide graphical user interfaces. The electronic device 200 can also include a communications bus 204 that connects the aforementioned elements of the electronic device 200. Network interfaces 214 can include a receiver and a transmitter (or transceiver), and an antenna for wireless communications.

The processor 202 can include one or more of any type of processing device, e.g., a central processing unit (CPU). Also, for example, the processor can be central processing logic. Central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software controlled microprocessor, discrete logic, e.g., an application specific integrated circuit (ASIC), a programmable/programmed logic device, memory device containing instructions, etc., or combinatorial logic embodied in hardware. Furthermore, logic may also be fully embodied as software.

The memory 230, which can include RAM 212 and ROM 232, can be enabled by one or more of any type of memory device, e.g., a primary (directly accessible by the CPU) or secondary (indirectly accessible by the CPU) storage device (e.g., flash memory, magnetic disk, optical disk). The RAM can include an operating system 221, data storage 224, which may include one or more databases, and programs and/or applications 222, which can include, for example, software aspects of the native advertisements placement program 223. The ROM 232 can also include BIOS 220 of the electronic device.

The Program 223 is intended to broadly include or represent all programming, applications, algorithms, software and other tools necessary to implement or facilitate methods and systems according to embodiments of the invention. The elements of the Program 223 may exist on a single server computer or be distributed among multiple computers or devices or entities, which can include advertisers, publishers, data providers, etc. In some embodiments, the program may be or include a native advertisement placement engine. In other embodiments, the engine 223 can be a native content, or native non-advertising content, placement program.

The power supply 206 contains one or more power components, and facilitates supply and management of power to the electronic device 200.

The input/output components, including I/O interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, and one or more input/output interfaces. A network care, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the native advertisements placement program 223, via a network to another device. Also, an application server may, for example, host a Web site that can provide a user interface for administration of example aspects of the native advertisements placement program 223.

Any computing device capable of sending, receiving, and processing data over a wired and/or a wireless network may act as a server, such as in facilitating aspects of implementations of the native advertisements placement program 223. Thus, devices acting as a server may include devices such as dedicated rack-mounted servers, desktop computers, laptop computers, set top boxes, integrated devices combining one or more of the preceding devices, etc.

Servers may vary in widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, etc.

A server may include, for example, a device that is configured, or includes a configuration, to provide data or content via one or more networks to another device, such as in facilitating aspects of an example native advertisements placement program 223. One or more servers may, for example, be used in hosting a Web site, such as the Yahoo! Web site. One or more servers may host a variety of sites, such as, for example, business sites, informational sites, social networking sites, educational sites, wikis, financial sites, government sites, personal sites, etc.

Servers may also, for example, provide a variety of services, such as Web services, third-party services, audio services, video services, email services, instant messaging (IM) services, SMS services, MMS services, FTP services, voice or IP (VOIP) services, calendaring services, phone services, advertising services etc., all of which may work in conjunction with example aspects of an example native advertisements placement program 223. Content may include, for example, text, images, audio, video, advertisements, etc.

In example aspects of the native advertisements placement program 223, client devices may include, for example, any computing device capable of sending and receiving data over a wired and/or a wireless network. Such client devices may include desktop computers as well as portable devices such as cellular telephones, smart phones, display pagers, radio frequency (RF) devices, infrared (IR) devices, Personal Digital Assistants (PDAs), handheld computers, GPS-enabled devices tablet computers, sensor-equipped devices, laptop computers, set top boxes, wearable computers, integrated devices combining one or more of the preceding devices, etc.

Client devices, as may be used in example native advertisements placement programs, may range widely in terms of capabilities and features. For example, a cell phone, smart phone or tablet may have a numeric keypad and a few lines of monochrome LCD display on which only text may be displayed. In another example, a Web-enabled client device may have a physical or virtual keyboard, data storage (such as flash memory or SD cards), accelerometers, gyroscopes, GPS or other location-aware capability, and a 2D or 3D touch-sensitive color screen on which both text and graphics may be displayed.

Client devices, such as client devices 102-106, for example, as may be used in example native advertisements placement programs, may run a variety of operating systems, including personal computer operating systems such as Windows, iOS or Linux, and mobile operating systems such as iOS, Android, and Windows Mobile, etc. Client devices may be used to run one or more applications that are configured to send or receive data from another computing device. Client applications may provide and receive textual content, multimedia information, etc. Client applications may perform actions such as browsing webpages, using a web search engine, sending and receiving messages via email, SMS, or MMS, playing games (such as fantasy sports leagues), receiving advertising, watching locally stored or streamed video, or participating in social networks.

In example aspects of the native advertisements placement program 223, one or more networks, such as networks 110 or 112, for example, may couple servers and client devices with other computing devices, including through wireless network to client devices. A network may be enabled to employ any form of computer readable media for communicating information from one electronic device to another. A network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and a telephone link.

A wireless network, such as wireless network 110, as in an example native advertisements placement program 223, may couple devices with a network. A wireless network may employ stand-alone ad-hoc networks, mesh networks, Wireless LAN (WLAN) networks, cellular networks, etc.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, etc. Access technologies such as 2G, 2.5G, 3G, 4G, and future access networks may enable wide area coverage for client devices, such as client devices with various degrees of mobility. For example, wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, etc. A wireless network may include virtually any wireless communication mechanism by which information may travel between client devices and another computing device, network, etc.

Internet Protocol may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), wide area networks (WANs), wireless networks, and long haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

A "content delivery network" or "content distribution network" (CDN), as may be used in an example native advertisements placement program 223, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's Web site infrastructure, in whole or in part, on the third party's behalf.

A peer-to-peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Some embodiments include direct or indirect use of social networks and social network information, such as in targeted advertising or advertisement selection. A "Social network" refers generally to a network of acquaintances, friends, family, colleagues, and/or coworkers, and potentially the subsequent connections within those networks. A social network, for example, may be utilized to find more relevant connections for a variety of activities, including, but not limited to, dating, job networking, receiving or providing service referrals, content sharing, creating new associations or maintaining existing associations with like-minded individuals, finding activity partners, performing or supporting commercial transactions, etc.

A social network may include individuals with similar experiences, opinions, education levels and/or backgrounds, or may be organized into subgroups according to user profile, where a member may belong to multiple subgroups. A user may have multiple "1:few" circles, such as their family, college classmates, or coworkers.

A person's online social network includes the person's set of direct relationships and/or indirect personal relationships. Direct personal relationships refers to relationships with people the user communicates with directly, which may include family members, friends, colleagues, coworkers, and the like. Indirect personal relationships refers to people with whom a person has not had some form of direct contact, such as a friend of a friend, or the like. Different privileges and permissions may be associated with those relationships. A social network may connect a person with other people or entities, such as companies, brands, or virtual persons. A person's connections on a social network may be represented visually by a "social graph" that represents each entity as a node and each relationship as an edge.

Users may interact with social networks through a variety of devices. Multi-modal communications technologies may enable consumers to engage in conversations across multiple devices and platforms, such as cell phones, smart phones, tablet computing devices, personal computers, televisions, SMS/MMS, email, instant messenger clients, forums, and social networking sites (such as Facebook, Twitter, and Google+), or others.

In some example native advertisements placement program 223, various monetization techniques or models may be used in connection with contextual or non-search related advertising, as well as in sponsored search advertising, including advertising associated with user search queries, and non-sponsored search advertising, including graphical or display advertising. In an auction-based online advertising marketplace, advertisers may bid in connection with placement of advertisements, although many other factors may also be included in determining advertisement selection or ranking. Bids may be associated with amounts the advertisers pay for certain specified occurrences, such as for placed or clicked-on advertisements, for example. Advertiser payment for online advertising may be divided between parties including one or more publishers or publisher networks, and one or more marketplace facilitators or providers, potentially among other parties.

Some models include guaranteed delivery advertising, in which advertisers may pay based on an agreement guaranteeing or providing some measure of assurance that the advertiser will receive a certain agreed upon amount of suitable advertising, and non-guaranteed delivery advertising, which may be individual serving opportunity-based or spot market-based. In various models, advertisers may pay based on any of various metrics associated with advertisement delivery or performance, or associated with measurement or approximation of a particular advertiser goal. For example, models can include, among other things, payment based on cost per impression or number of impressions, cost per click or number of clicks, cost per action for some specified action, cost per conversion or purchase, or cost based on some combination of metrics, which can include online or offline metrics.

The process of buying and selling online advertisements may include or require the involvement of a number of different entities, including advertisers, publishers, agencies, networks, and developers. To simplify this process, some companies provide mutual organization systems called "ad exchanges" that connect advertisers and publishers in a unified platform to facilitate the bidded buying and selling of online advertisement inventory from multiple ad networks. "Ad networks" refers to companies that aggregate ad space supply from publishers and provide en masse to advertisers.

For Web portals, such as Yahoo!, advertisements may be displayed on web pages resulting from a user-defined search based upon one or more search terms. Such advertising is most beneficial to users, advertisers and web portals when the displayed advertisements are relevant to the web portal user's interests. Thus, a variety of techniques have been developed to infer the user's interests/intent and subsequently target the most relevant advertising to that user.

One approach to improving the effectiveness of presenting targeted advertisements to those users interested in receiving product information from various sellers is to employ demographic characteristics (i.e., age, income, sex, occupation, etc.) for predicting the behavior of groups of different users. Advertisements may be presented to each user in a targeted audience based upon predicted behaviors rather than in response to certain keyword search terms.

Another approach is profile-based ad targeting. In this approach, user profiles specific to each user are generated to model user behavior, for example, by tracking each user's path through a web site or network of sites, and then compiling a profile based on what pages and advertisements were delivered to the user. Using aggregated data, a correlation develops between users in a certain target audience and the products that those users purchase. The correlation then is used to target potential purchasers by targeting content or advertisements to the user at a later time.

During the presentation of advertisements, the presentation system may collect detailed information about the type of advertisements presented to the user. This information may be used for gathering analytic information on the advertising or potential advertising within the presentation. A broad range of analytic information may be gathered, including information specific to the advertising presentation system. Advertising analytics gathered may be transmitted to locations remote to the local advertising presentation system for storage or for further analysis. Where such advertising analytics transmittal is not immediately available, the gathered advertising analytics may be saved by the advertising presentation system until the transmittal of those advertising analytics becomes available.

Some embodiments of the invention relate, directly or indirectly to native advertisement placement. Native advertisements can include, among other things, advertisements, such as online advertisements, that, to some degree, blend, match, flow with, or are in some ways similar to the context of the user's experience, such as may include non-advertising items or content. In some embodiments, Native ads can include, among other things, formats that may match or be similar to the form or function of the user experience in which the ad is presented. In some embodiments, native advertisements may seem less obtrusive or intrusive to the user or to the user's experience.

Some embodiments of the invention provide systems, methods, platforms and techniques relating to native ads, such as in connection with placement of native ads. Some embodiments include automatically detecting, locating, determining or selecting candidate locations, locations, contexts, or situations for placing or serving native ads, such as, for example, on or positioned in, or within content of, a publisher's Web site. This may include determining, for example, locations or placements, relative locations or placements, or appropriate, good or optimized locations or placements for the native ads. Such locations or placements may, for example, be at least partly based on factors consistent with form and function of native ads, which can, in some embodiments, include, among other things, non-intrusiveness, non-intrusive look or feel, continuity or blending, or a desired degree of continuity or blending with context and content, content-relatedness, not interfering with user experience or confusing users, high probability of attention, click or other desirable user action, or others. In various embodiments, this may be done without user (such as, for example, a publisher or agent of a publisher) input or action during the process, automatically, semi-automatically, or in user-assisted fashion. Some embodiments include analysis or automatic analysis of publishers' Web sites, such as, for example, in determining the candidate locations or the locations.

In some embodiments, a user (as an example, a publisher) selects (such as through a user-facing GUI) one or more Document Object Model (DOM) elements (or content or items associated with such elements), which may relate, for example, to a publisher's HTML Page (which can relate to content or other elements). A native advertisements placement system or engine may then use one of several approaches, using the selected DOM elements, to determine native advertisement placement candidate containers from the DOM.

In some embodiments, determined candidate containers may be useable in determining native advertisement placement, such as, for example, in connection with particular content or content items associated with the candidate containers, or some of them. This can include, for example, among other things, placing, which can include targeting, serving, presenting, etc., native advertisements in association with such content or content items, such as in or near such content or content items, within a group, flow or visible flow of such content or content items, positioning the advertisement within, adjacent to, or as part of such content or content items, etc.

Some embodiments provide content-guided native advertisements placement systems and methods. In some embodiments, some of the difficulties of a Native Ads serving platform may be avoided or mitigated by techniques that include detection of candidate native ad placements on publishers' properties. In some embodiments, automating native ad placement detection can reduce adoption friction and can help reduce integration, for example, from weeks to hours. Some embodiments approach the problem of Native Ad Document Object Model (DOM) element detection in a qualitatively different viewpoint than other embodiments. Searching is performed for secondary sources for the main content that is available on, for example, a publisher's property. For each article on the secondary source, searching is performed for the corresponding content on the main web property and then detecting is performed of the DOM element that encompasses all HTML tags associated with that content. For example, two alternative sources of secondary information may be utilized, namely RSS and mobile web properties (that may be, by necessity, mainly content-focused.)

Some embodiments of the invention provide generalized XPaths (where XPaths relate to XML Path Language) native advertisements placement systems and methods. In some embodiments, generalized XPaths may relate to return or output of DOM traversal or DOM related analysis according to techniques or algorithms, or portions thereof, according to some embodiments of the invention. A starting point may be the DOM of the publisher's HTML property. In some user-assisted embodiments, the user, such as the publisher, is requested to select one or more elements within what they consider to be an appropriate DOM element for Native advertisements placement. The system detects the deepest DOM node that is an ancestor of all user-selected elements and computes its path from the DOM root in the form of an XPath where only the HTML tag names are considered. This XPath will correspond to a set of k DOM elements, as it points on an element within a candidate Native Ad container which, in some embodiments, by definition, appears more than once on the page. In some embodiments, the system then repeatedly traverses the path towards the DOM root until it reaches a position where the corresponding XPath corresponds to less than k DOM nodes. The last XPath created that corresponds to k nodes may be the system's result, while its associated k DOM nodes are the candidate native ad placement locations.

Some embodiments of the invention provide frequent markup sequences systems or methods, in ad placement. In some embodiments, such a system returns as native ads placement results, all HTML markup sequences that are at least L tags long, appear at least R times on the property and correspond to a single DOM element. Several approaches are possible.

In providing frequent markup sequences systems or methods, a first approach, according to some embodiments, is a Suffix Trees Approach. In some embodiments, the suffix tree is created of a string S comprising all tags in the DOM. For each internal node of the Suffix Tree of S, the number of its leaf nodes is computed. If an internal node has K leafs, then the substring formed by all labels on the unique path from the root to that node appears in S exactly K times. A depth-first traversal may be performed starting from the root, pruning the recursion when the number of leafs of the current node drops below R. By construction, each internal node corresponds to a markup subsequence that appears at least R times in S. All such subsequences are returned that satisfy remaining restrictions.

In providing frequent markup sequences systems or methods, a second approach, according to some embodiments, is a node flattening approach. In some embodiments, the system traverses the DOM. At each node, it creates a string corresponding to the current node's tag name concatenated with the tag names of its children nodes. Deeper flattening of the DOM rooted at the current node is also an option, in some embodiments. Subsequently, the system collects the set of all nodes corresponding to strings that appear at least R times. Finally, the system returns as Native Ad location results, all nodes from the set that are not parents of another node in the set.

Figure 3:
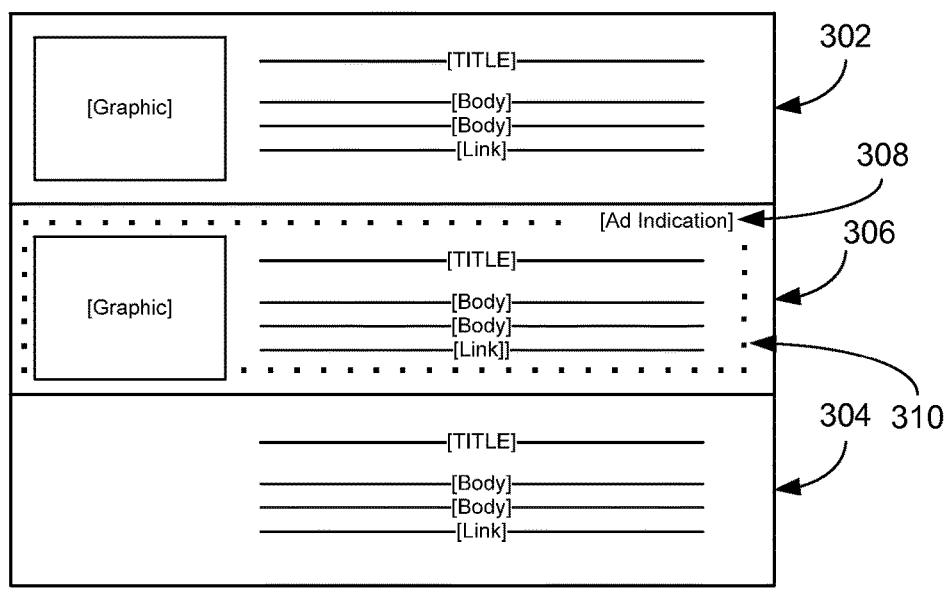
FIG. 3 illustrates a block diagram of a graphical user interface according to one embodiment of the invention.

FIG. 3 illustrates a block diagram of a graphical user interface 300 according to one embodiment of the invention. In Particular, FIG. 3 provides a simplified illustration of a portion of a web page including a native ad 306, placement of which can be facilitated by techniques according to the invention. As depicted, the native ad 306, appears in, or injected or placed into, a group, series or flow of content items 302, 304, such as native content items. Form and function of native ads can, of course, vary, but, as depicted, the native ad 306 including a textual indication 308 that is an ad, which may also be a link, etc., as well as shading, as represented by dots 310, which may, in some embodiments, distinguish or subtly distinguish the native ad from other content items while not breaking abruptly or drastically from the content item context, for example. Each of the native ad 306 and the content items 302, 304 may include various components, which can include sub-items or sub-content, such as a link (such to an article, other content item, larger ad, etc.) title, body text, one or more graphics, and may include any number of other components, such as audio, video, etc.

Some embodiments of the invention include determining one or more HTML containers (which may include one or more meta-containers containing multiple smaller containers) with which native ads may be associated, such as by eventually or potentially being placed into or adjacent to. For example, as depicted in FIG. 3, some embodiments of the invention may include determining an HTML container associated with the set of content items that include content items 302 and 304. As depicted, the native ad 306 is injected in the flow or group of content items that include content items 302 and 304, and may include other content items that are not depicted.

Figure 4:
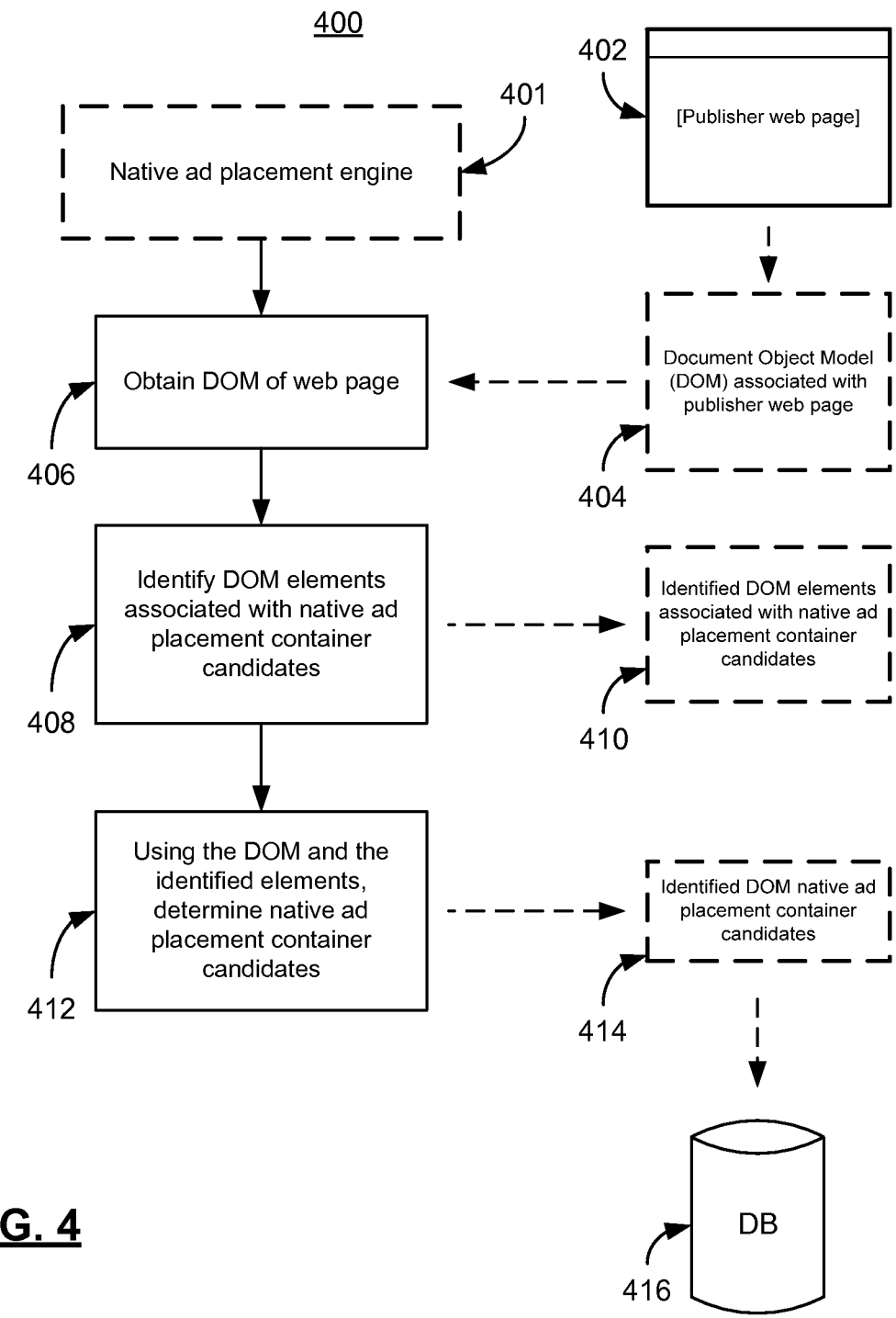
FIG. 4 illustrates a flow diagram of example operations of one or more aspects of a system or method according to one embodiment of the invention.

FIG. 4 illustrates a flow diagram 400 of example operations of one or more aspects of a system or method according to one embodiment of the invention. As depicted, the steps are carried out by a native ad placement engine 401.

At step 406, the native ad placement engine 401 obtains a DOM 404 of a web page, such as a publisher web page 402 onto which ads are to be placed.

At step 408, the engine 401 identifies DOM elements 410 associated with native ad placement container candidates. In some embodiments, this can include identifying DOM elements associated with containers that would or might make good, appropriate, fitting, etc, native ad placement container candidates.

At step 412, the engine 401, using the DOM and the identified elements, perhaps among other things, determines native ad placement container candidates 414.

Throughout the steps depicted in FIG. 4, data may be stored, sent, and received to and from one or more databases 416 accessible directly or indirectly by the engine 401.

Figure 5:
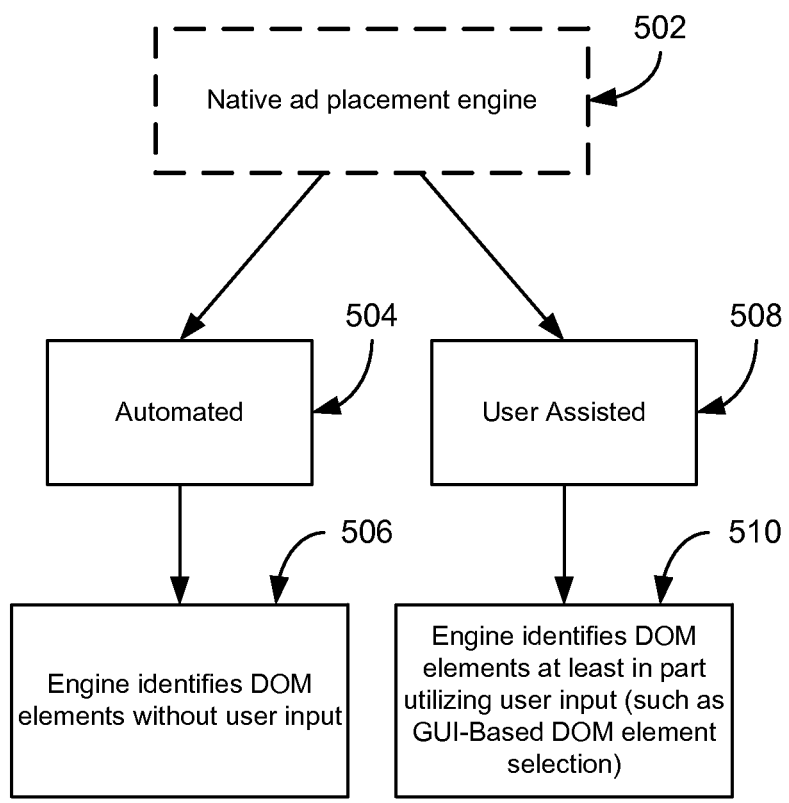
FIG. 5 illustrates a block diagram of a system that can implement one or more aspects of a system according to one embodiment of the invention.

FIG. 5 illustrates a block diagram of a system 500 that can implement one or more aspects of a system according to one embodiment of the invention. Particularly, FIG. 5 illustrates aspects of types of a native ad placement engine 502. Specifically, as depicted, some engines 502 are automated 504 and require no user input 506. Other engines 502 may be user-assisted 508, and the engine 502 may identify the DOM elements, associated with native ad placement container candidates, at least in part utilizing user input 510, such as, for example, direct or indirect GUI-based DOM element selection.

Figure 6:
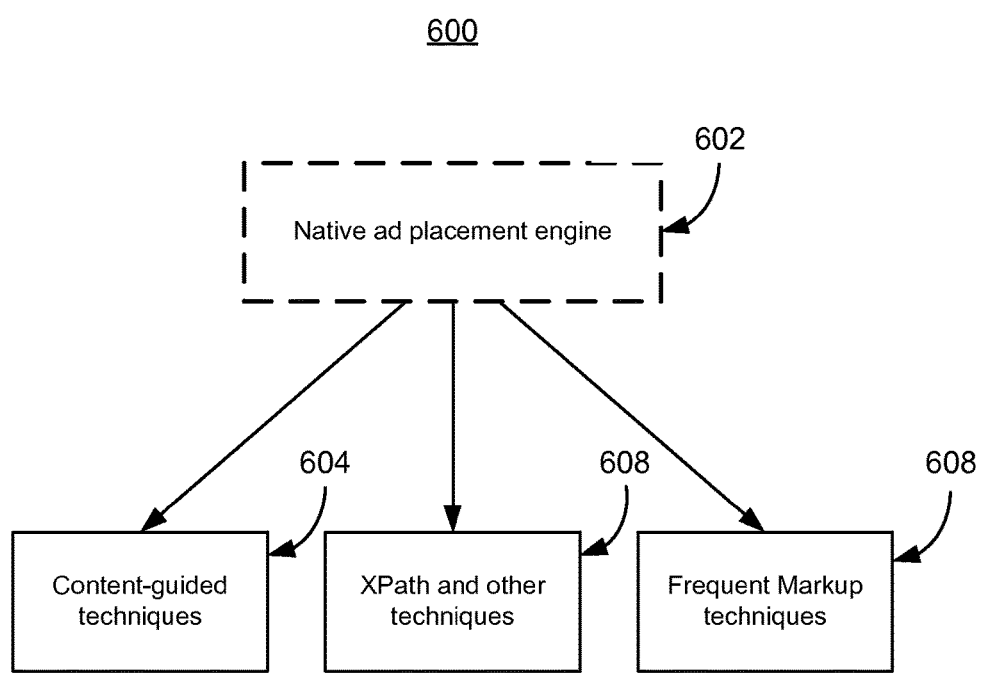
FIG. 6 illustrates a block diagram of a system that can implement one or more aspects of a system according to one embodiment of the invention.

FIG. 6 illustrates a block diagram of a system 600 that can implement one or more aspects of a system according to one embodiment of the invention. Particularly, FIG. 6 illustrates various techniques that may be used by various embodiments of a native ad placement engine 602. Specifically, among other things, the engine 602 may use, for example, content-guided techniques or algorithms 604, XPath related techniques or algorithms or other techniques or algorithms 606, or frequent markup techniques or algorithms 608, or some combination, possibly among other things.

Figure 7:
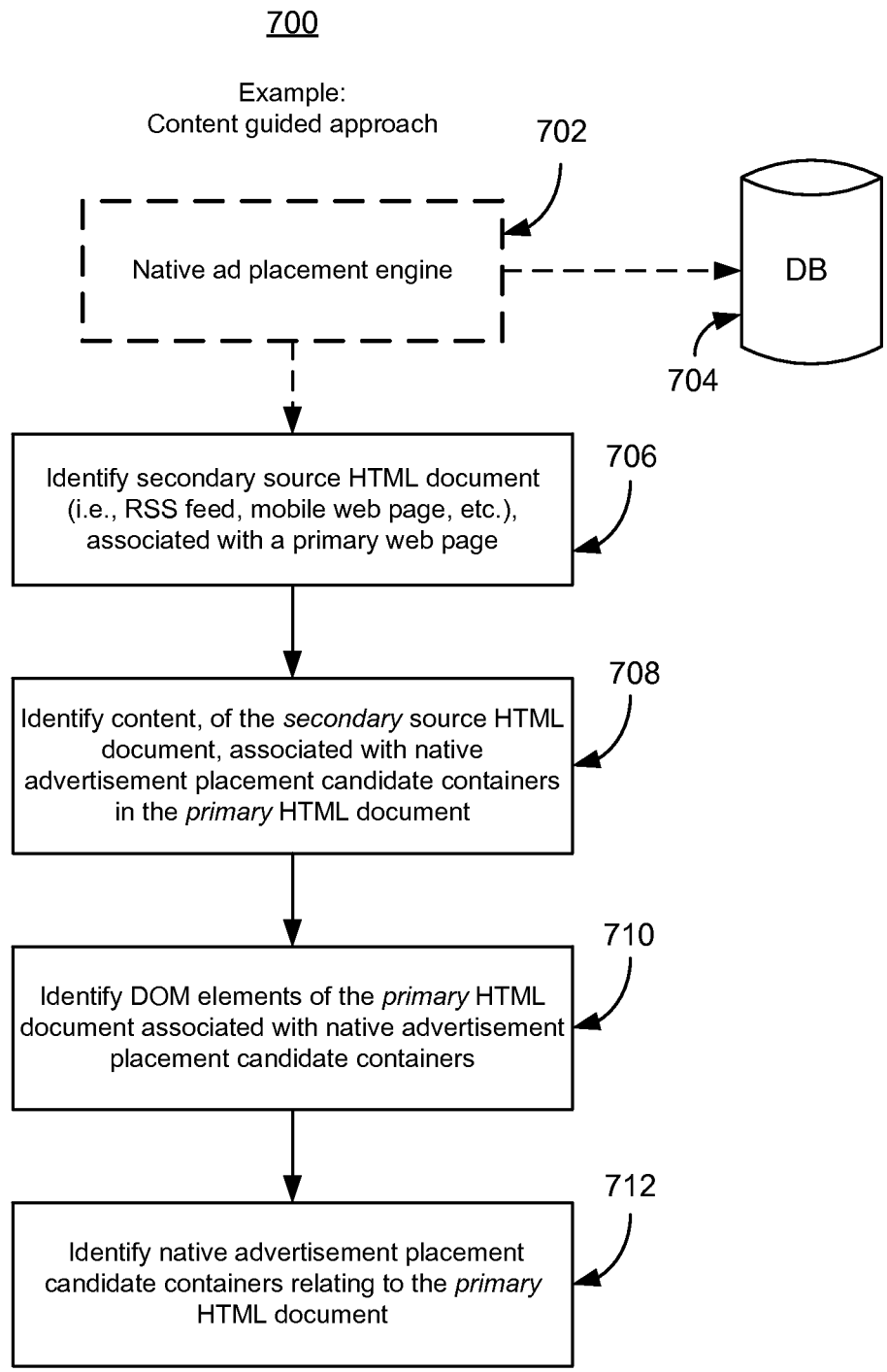
FIG. 7 illustrates a flow diagram of example operations of one or more aspects of a system or method according to one embodiment of the invention.

FIG. 7 illustrates a flow diagram 700 of example operations of one or more aspects of a system or method according to one embodiment of the invention, including a native ad placement engine 702 that can send, receive and store information in one or more databases 704.

At step 706, the engine 702 identifies a secondary source HTML document (i.e., RSS feed, mobile web page, etc.), or more than one, associated with a primary web page.

At step 708, the engine 702 identifies content, of the secondary source HTML document, associated with native advertisement placement candidate containers in the primary HTML document.

At step 710, the engine 702 identifies DOM elements of the primary HTML document associated with native advertisement placement candidate containers.

At step 712, the engine 702 identifies native advertisement placement candidate containers relating to the primary HTML document.

Some embodiments using a content-guided approach include searching for and finding secondary sources for the main content that is available on, for example, a publisher's property, such as a web site. For each of a set of articles (for example) on the secondary source, a native ad placement engine may search for and find the corresponding content on the main or primary property, such as a publisher's web site. The engine may then detect the DOM element or container that encompasses all HTML tags associated with that content. Two example types of secondary sources are RSS and mobile web properties.

For example, a hypothetical RSS content container from a hypothetical news site, znn.com might include the following:

```
1  <item>
2    <title>Save the butterflies</title>
3    <guid>http://www.znn.com/2013/02/14/opinion/
         smith-butterflies/index.html</guid>
4    <link>http://rss.znn.com/~r/rss/znn_topstories/~3/CkZP-NnVnxY/
         Index.html</link>
5    <description>Ten years ago, [. .]
6    </description>
7    <pubDate>Fri, 14 Feb 2013 19:10:22 EST</pubDate>
8  </item>
```

In some embodiments, the engine extracts the content from the main tags in <item> and searches for and finds it on the main web property. In this example, the engine may search for <title> and <description>. The engine identifies the DOM elements that contain the corresponding content and then searches for and finds the DOM element that is the deepest ancestor of all of them. The engine may then return all such DOM elements, corresponding to all <item> entries, as native ad placement candidate containers.

Figure 8:
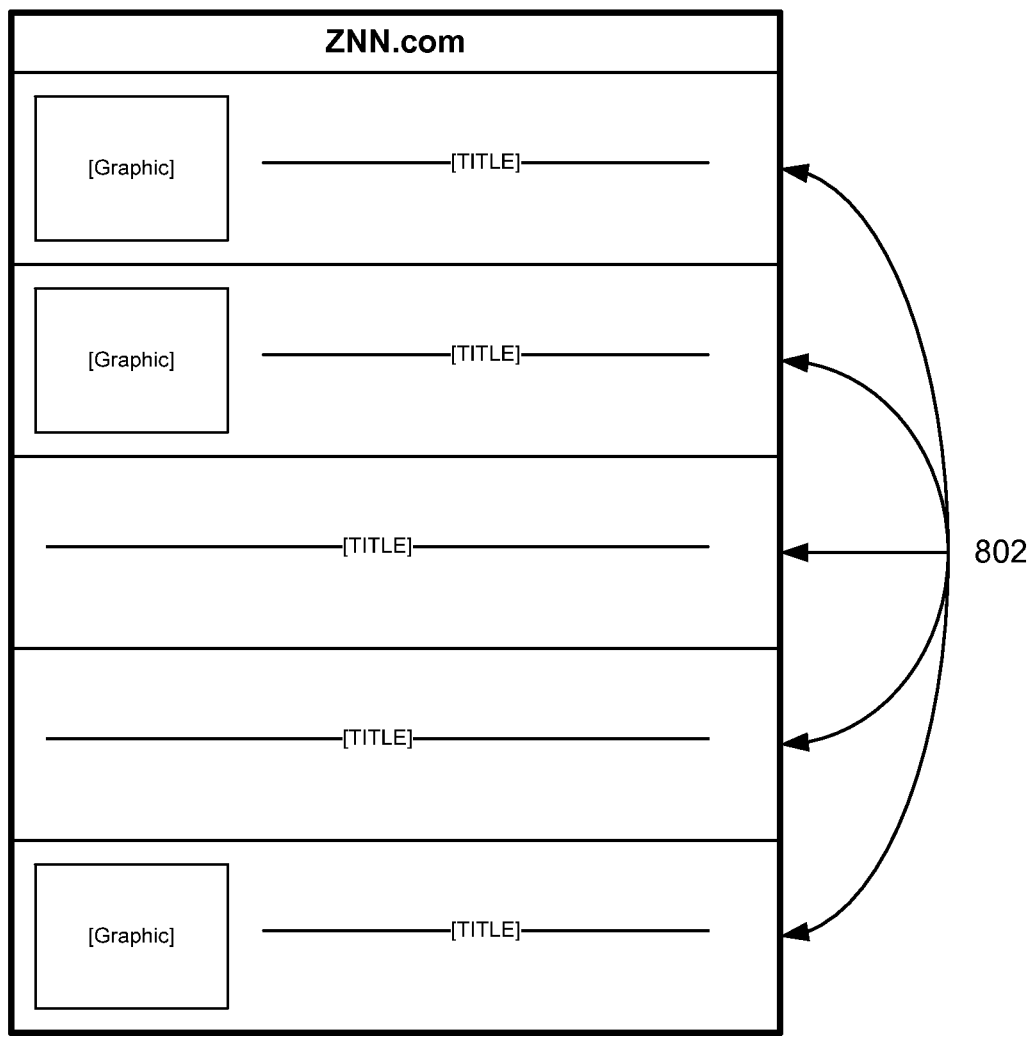
FIG. 8 illustrates a block diagram of a system that can implement one or more aspects of a system according to one embodiment of the invention.

FIG. 8 illustrates a block diagram of a system 800 that can implement one or more aspects of a system according to one embodiment of the invention. In particular, FIG. 8 depicts a simplified portion of a hypothetical mobile web page from the hypothetical news site, znn.com. In a way somewhat similar to that of the content-guided approach example with RSS, the engine may identify mobile property elements that may contain content, and may search for and find it on the main or primary property. Such an approach may have an advantage that, typically, mobile versions of web properties present non-content elements sparingly due to the limited screen area. As depicted on the mobile web page of FIG. 8, various content items 802 may be identified or easily identified, each of which, as depicted, may include components such as title, graphic, etc., may be associated with various content sections such as US News, World News, etc.

Figure 9:
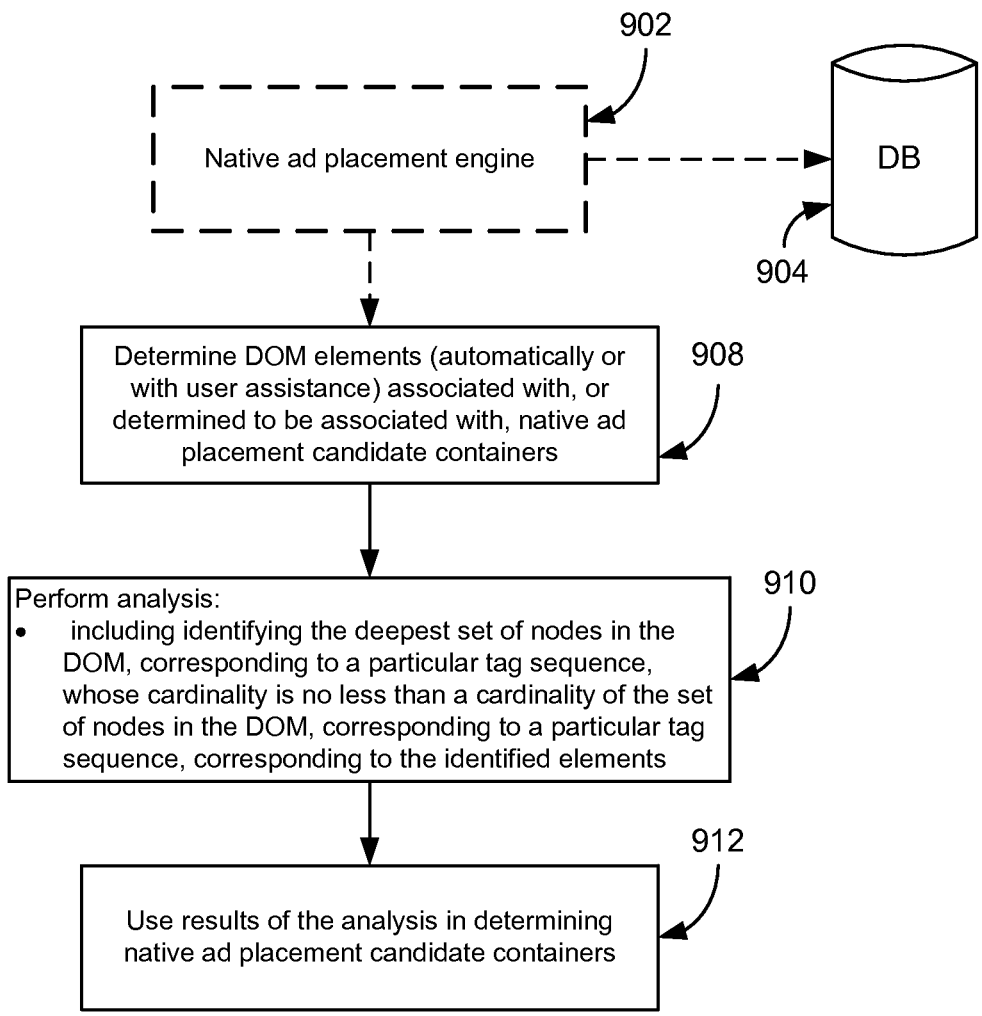
FIG. 9 illustrates a flow diagram of example operations of one or more aspects of a system or method according to one embodiment of the invention.

FIG. 9 illustrates a flow diagram 900 of example operations of one or more aspects of a system or method according to one embodiment of the invention, including a native ad placement engine 902 that can send, receive and store information in one or more databases 904.

At step 908, the engine 902 determines DOM elements (automatically or with user assistance) associated with, or determined to be associated with, native ad placement candidate containers.

At step 910, the engine performs analysis, including identifying the deepest set of nodes in the DOM, corresponding to a particular tag sequence, whose cardinality is no less than a cardinality of the set of nodes in the DOM, corresponding to a particular tag sequence, corresponding to the identified elements.

At step 912, the engine 902 uses analysis results in determining native ad placement candidate containers.

Figure 10:
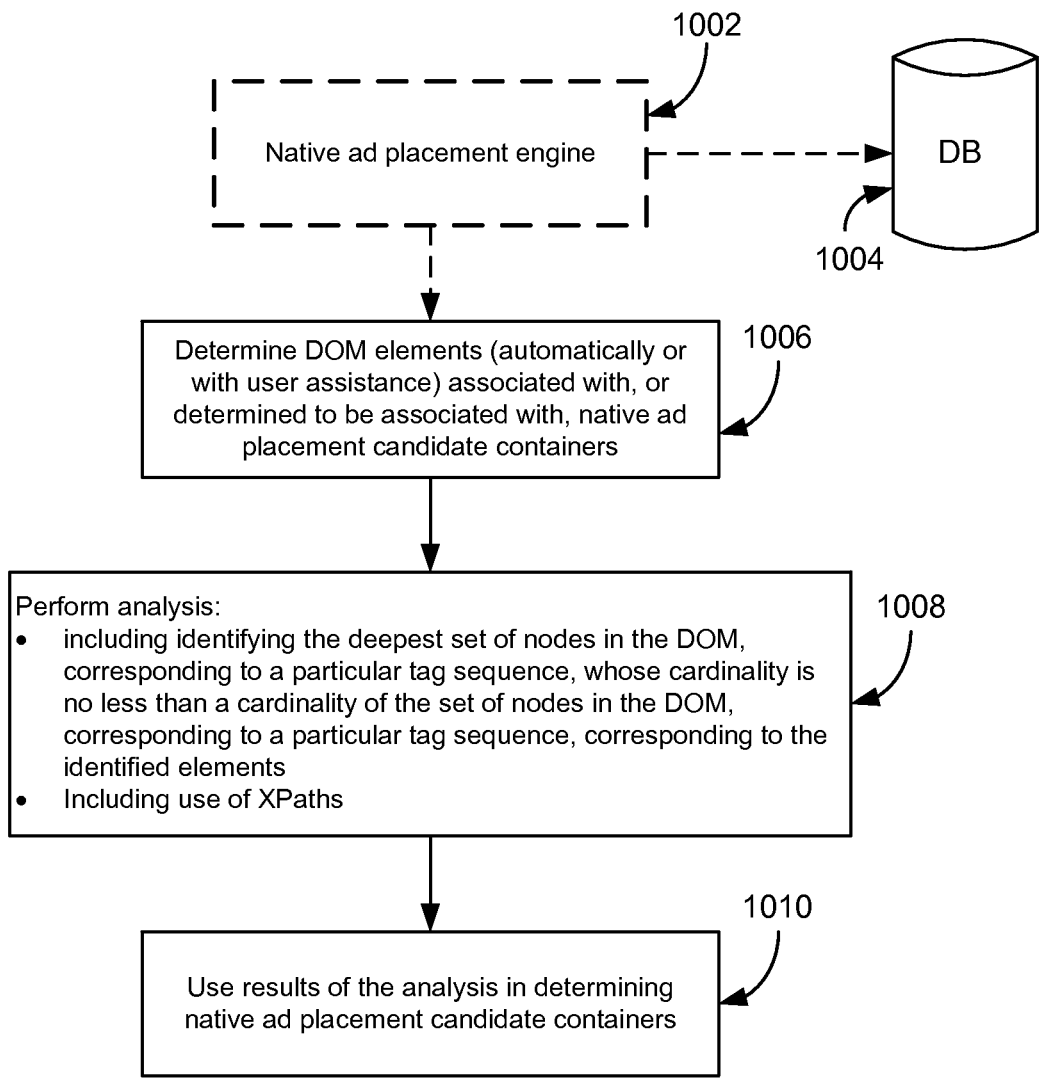
FIG. 10 illustrates a flow diagram of example operations of one or more aspects of a system or method according to one embodiment of the invention.

FIG. 10 illustrates a flow diagram 1000 of example operations of one or more aspects of a system or method according to one embodiment of the invention. Elements 1002-1010 are similar in many ways to elements 902-910 as depicted in FIG. 9. However, at step 1008, the analysis expressly includes use of XPaths.

Figure 11:
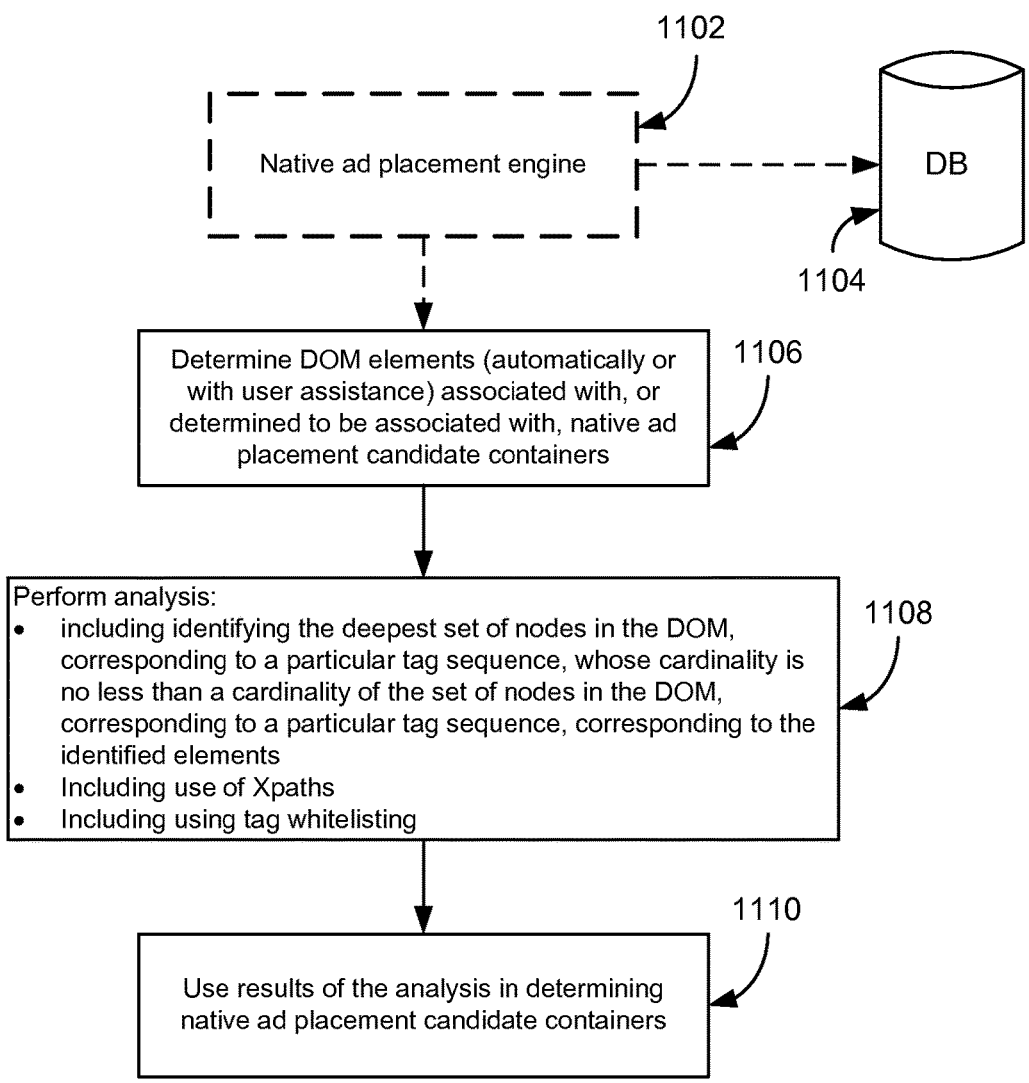
FIG. 11 illustrates a flow diagram of example operations of one or more aspects of a system or method according to one embodiment of the invention.

FIG. 11 illustrates a flow diagram 1100 of example operations of one or more aspects of a system or method according to one embodiment of the invention. Elements 1102-1110 are similar in many ways to elements 1002-1010 as depicted in FIG. 10. However, at step 1108 the analysis expressly includes use of tag whitelisting.

Some embodiments obtain, for example, a DOM of a publisher's HTML web page, where elements on the web page may correspond to nodes on the DOM. Some embodiments employ a fully automated approach, while others use at least some user assistance, in determining DOM elements associated with native ad placement container candidates.

In some embodiments, for example, a user (such as, for example, a publisher) is requested to select one or more elements within what the user considers to be an appropriate DOM element for native ads placement, such as through a graphical user interface (GUI) that may be provided to the user. In some embodiments, the system detects the deepest DOM node (i.e. furthest from the root) that is an ancestor of all user-selected elements (for simplicity, a node is considered to be an ancestor of itself) and computes its path from the DOM root in the form of an XPath where only the HTML tag names are considered. In some embodiments, this path will correspond to k≥2 DOM elements, as it points on an element within a candidate native ad placement candidate container which, by definition, appears more than once on the page. The system may then repeatedly traverse the path towards the DOM root until it reaches a position where the corresponding XPath corresponds to less than k DOM nodes. The last XPath created that corresponds to k nodes is the system's result, while its associated k DOM nodes may be candidate native ad placement positions, locations, relative locations, etc.

The following simple HTML document ("HTML Document 1") is provided to use as an example:

```
1   <html>
2     <body>
3       <div id="div1">
4         <article id="article">
5           <img src="image1.gif>
6           <div>
7             <a href="/link1.html">Link 1</a>
8           </div>
9         </article>
10        <article id="article2">
11          <img src="image2.gif
12          <div>
13            <a href="/link2.html">Link 2</a>
14          </div>
15        </article>
16      </div>
17      <div id="div2">
18        <article id="article3">
19          <img src="image3.gif>
20          <div>
21            <a href="/link3.html">Link 3</a>
22          </div>
23        </article>
24      </div>
25    </body>
26  </html>
```

As an example, the user has provided the anchor link on line 13 as input the system. XPath /html/body/div/article/div/a is deduced. The system detects 3 nodes that correspond to the XPath. It then examines XPath /html/body/div/article/div/a/ . . . . Again, 3 nodes correspond to it. It then examines /html/body/div/article/div/a/ . . . / . . . and also detects that 3 noes correspond to it. Finally, it examines XPath /html/body/div/article/div/a/ . . . / . . . / . . . and detects that less than 3 DOM nodes correspond to it. It therefore returns /html/body/div/article as its result.

Generally, some embodiments identify the deepest set of nodes in the DOM, corresponding to a particular tag sequence, whose cardinality is no less than a cardinality of the set of nodes in the DOM, corresponding to a particular tag sequence, corresponding to the identified elements. As a simplified example, suppose that a DOM tag sequence for an HTML document can be represented in a simplified fashion as Tag 1/Tag 2/Tag 3/Tag 4. Suppose that this sequence corresponds to 3 nodes that correspond to identified elements that are associated with native ad candidate containers. In a sense navigating or stepping back toward the root, suppose that Tag 1/Tag 2/Tag 3/Tag4/ . . . is associated with 3 nodes as well. Further suppose that Tag 1/Tag 2/Tag3/Tag4/ . . . / . . . is associated with only 2 nodes. Still further, supposed that [Tag 1] is associated with 1 node. Some embodiments would step back to Tag 1/[Tag 2/Tag3/Tag4/ . . . / . . . , and upon examining it, determine that it is associated with only 2 nodes, which is less than 3, the number of nodes associated with the tag sequence associated with the identified elements. The system may then return Tag 1/Tag 2/Tag 3 as the result, since it is the deepest set of nodes in the DOM, corresponding to a particular tag sequence, whose cardinality is no less than a cardinality of the set of nodes in the DOM, corresponding to a particular tag sequence, corresponding to the identified elements.

Further elaborating on the above simple example, if tag whitelisting is utilized (as further described herein), and if Tag 2 happens to be whitelisted, then the system would not stop at Tag2, but would instead step back further to Tag 1. Since Tag 1 is not whitelisted, and since it is associated with fewer than 3 nodes, the system would stop there, and would return Tag 1/Tag 2 as the result.

In various user-assisted embodiments, the user may be presented with various approaches for selecting DOM elements, whether directly or indirectly. In one approach, the user may hover over candidate DOM elements, in which case the system immediately computes and displays the results. If the user is satisfied with the results, she clicks on the DOM element to select it and pause further computation of results. A subsequent click re-enables hover mode.

In another approach, the user may directly click on visible elements on the property. Each click toggles the selection of the particular element, and triggers the computation of the results, which are then displayed to the user. Further simple facilitation may be provided in the form of buttons that clear all selected elements, clear all results, or pause the computation of results.

In some embodiments, an automated system is used. The system also examines the DOM. In the absence of user input, the system selects one specific HTML tag type that is, or is highly or sufficiently probable to be, contained within a native ad placement candidate container, or be the container itself. Tags that may be used for this purpose include <img> or <a>, for example. Other tags, such as, for example, <article> or <li> may also be used, if present in the DOM, among potentially others. In some embodiments, for each tag, its path from the root is calculated in the form of an XPath. Subsequently, for each unique XPath computed, the generalized XPath algorithm is applied. The unique generalized XPaths are returned as results.

Continuing from the example above with HTML Document 1, the system might, for example, select all <img> tags on lines 5, 11 and 19. For each one, it computes its path from the root in the form of an XPath. In this case, all three XPaths are equal to /html/body/div/article/img. The XPath is therefore generalized to /html/body/div/article.

Alternatively, the system might select all <a> tags on lines 7, 13 and 21. The corresponding unique XPath is /html/body/div/article/div/a. The XPath is again generalized to /html/body/div/article. The fact that the same result has been obtained in both cases is an indication of the robustness of the technique or algorithm.

In some embodiments, XPath generalization is used to detect DOM containers that are as large as possible (by being represented by the shortest possible path from the DOM root) but without lumping together more than one native ad placement candidate container. In some cases, however, "growing" these containers even further, such as to find particular meta-containers, might be the desirable approach.

The following simple HTML document ("HTML Document 2") is provided to use as an example:

```
1   <html>
2     <body>
3       <div>
4         <article id="article1">
5           <div>
6             <a href="/link1A.html">
7               <img src="image1.gif">
8             </a>
9             <div>
10              <a href="/link1B.html">
11                Link 1
12              </a>
13              <p>Text 1</p>
14            </div>
15          </article>
16          <article id="article2">
17            <div>
```

```
18           <a href="/link2A.html">
19             <img src="image2.gif">
20           </a>
21           <div>
22             <a href="/link2B.html">
23               Link 2
24             </a>
25             <p>Text 2</p>
26           </div>
27         </article>
28       </div>
29     </body>
30   </html>
```

In some embodiments, in the above example (HTML Document 2), when starting from <a> tags, the system identifies /html/body/div/article/div as the appropriate native ad placement candidate containers. While these may be desired results, in this case, the property designer has already hinted at the location of the content containers by using the <article> tags.

In some embodiments, the system adapts to account for the presence of such "hints" as follows: during XPath generalization, the system repeatedly traverses the path towards the DOM root, so long as the number of elements corresponding to the current XPath remains the same, or the current tag is within a set of whitelisted tags.

Continuing the example, the number of DOM elements associated with /html/body/div/article has dropped to 2, while the corresponding number for /html/body/div/article/div was 4. However, since tag <article> is whitelisted, the system continues to traverse the path towards the DOM root. The number of DOM elements associated with /html/body/div is one, and therefore the result is /html/body/div/article.

Figure 12:
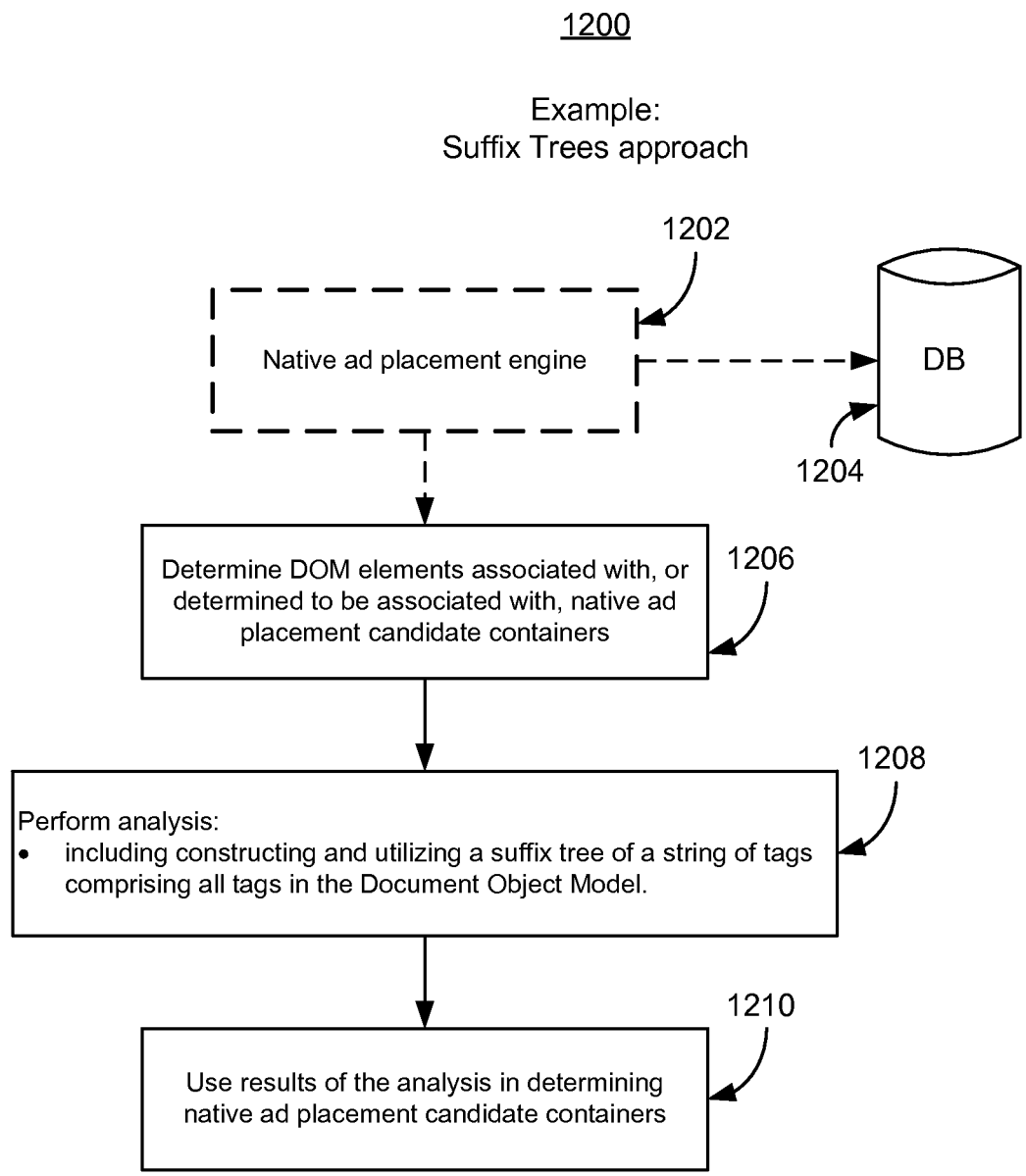
FIG. 12 illustrates a flow diagram of example operations of one or more aspects of a system or method according to one embodiment of the invention.
Figure 13:
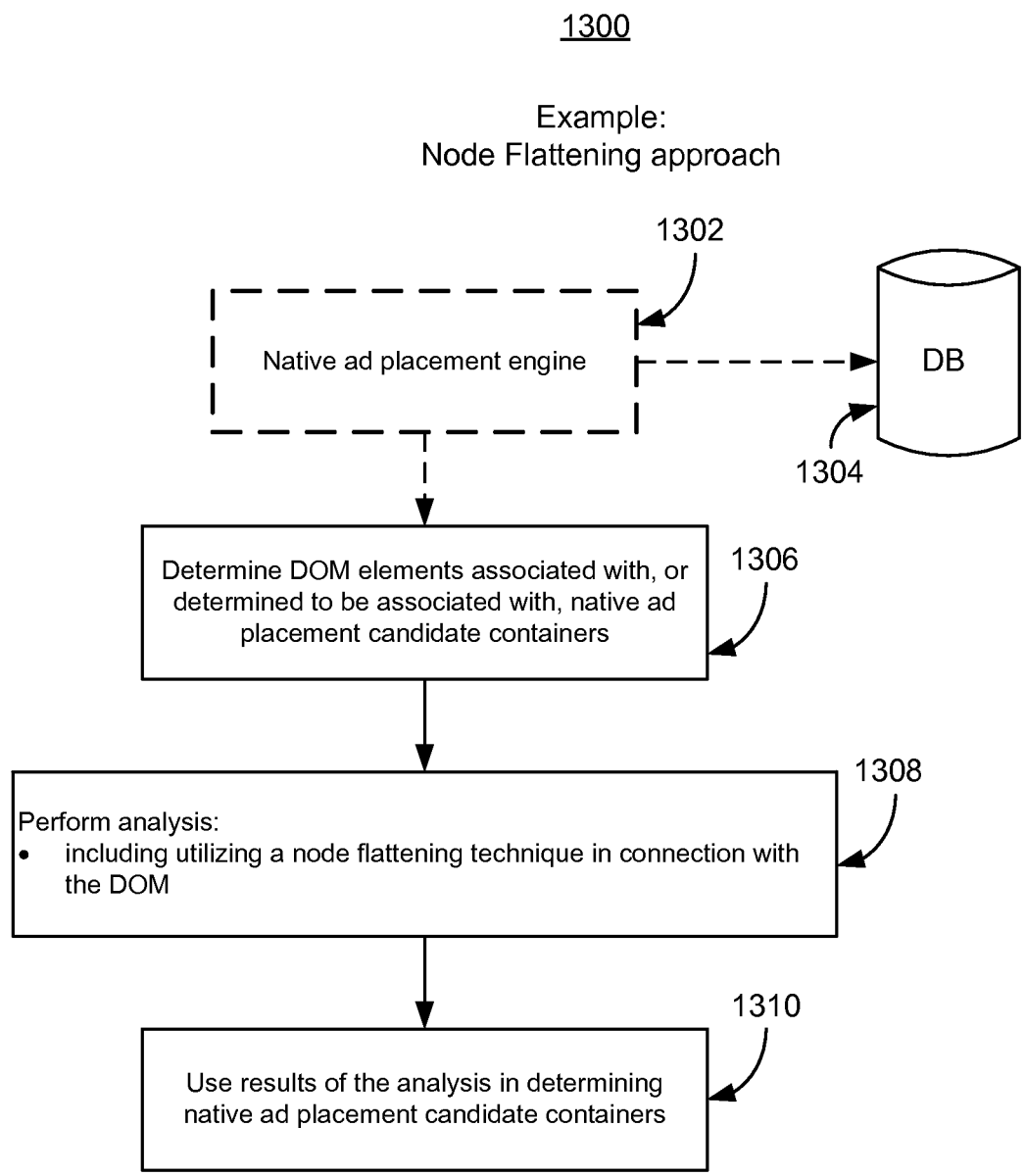
FIG. 13 illustrates a flow diagram of example operations of one or more aspects of a system or method according to one embodiment of the invention.

FIGS. 12 and 13 relate to embodiments of the invention that make use of suffix trees and node flattening techniques, such as in modeling and performing computation relating to a DOM of a HTML page, for example.

FIG. 12 illustrates a flow diagram 1200 of example operations of one or more aspects of a system or method according to one embodiment of the invention, including a native ad placement engine 1202 that can send, receive and store information in one or more databases 1204.

At step 1206, the engine 1202 determines DOM elements associated with, or determined to be associated with, native ad placement candidate containers.

At step 1208, the engine 1202 performs analysis, including constructing and utilizing a suffix tree of a string of tags comprising all tags in the Document Object Model.

At step 1210, the engine 1202 uses the results of the analysis in determining native ad placement candidate containers.

FIG. 13 illustrates a flow diagram 1300 of example operations of one or more aspects of a system or method according to one embodiment of the invention, including a native ad placement engine 1302 that can send, receive and store information in one or more databases 1304.

At step 1306, the engine 1302 determines DOM elements associated with, or determined to be associated with, native ad placement candidate containers.

At step 1308, the engine 1202 performs analysis, including utilizing a node flattening technique in connection with the DOM.

Some embodiments of the invention make use of suffix trees and node flattening techniques, such as in modeling and performing computation relating to a DOM of a HTML page, which may be used in the analysis, or part of it, leading to determination of native ad placement candidate containers. In some embodiments, the system (or a native ad placement engine) returns all markup sequences (i.e., sequences of HTML tags) that are at least L tags long, where L is a number, appear at least R times on the property, or in the DOM, where R is a number, and correspond to a single DSOM element. In some embodiments, L and R parameters that may be determined, adjusted or tuned to tune, adjust or optimize system performance and results, for example.

Some embodiments employ an approach that makes use of suffix trees. In some embodiments, this approach may prioritize system speed or runtime performance, since it can reduce computational complexity and required time.

In some embodiments, for example, a suffix tree (as known in the art) is constructed of a string, S, comprising all tags in the DOM. For example, suppose that S=<html><body><div><div></div></div></body></html>. For each internal node, the system computes the number of its leaf nodes. It is noted that if an internal node has k leafs, then the substring formed by all labels on the unique path from the root to that node appears in S exactly k times. For example, if an example string is the letters in the word "banana", consider the path ROOT→"a"→"na", it follows that the substring "ana" appears in "banana" exactly two times, since the last node on the path has exactly two leafs.

In some embodiments, the system performs a depth-first traversal starting from the root, and pruning the recursion when the number of leafs of the current node drops below R. By construction, each internal node corresponds to a markup subsequence that appears at least R times in S. In some embodiments, the system returns all such subsequences that satisfy the remaining restrictions: they are at least L tags long and represent a single DOM node (i.e., of the form <tag> . . . </tag>.

In some embodiments, a node flattening approach is employed. For example, in some embodiments, the system traverses the DOM, and, for each node, it creates a string corresponding to the current node's tag name concatenated with the tag names of its children nodes. In some embodiments, deeper flattering of the DOM rooted at the current node may also be utilized. In some embodiments, subsequently, the system collects the set of all nodes corresponding to strings that appear at least R times. Next, the system returns, as results, all nodes from the set that are not parents of another node in the set. Alternatively, in some embodiments, the system may remove from the list of results all nodes that are ancestors of other nodes in the set.

In some embodiments, whatever approach may be used, results filtering may (or may not) also be used. For example, in some embodiments, once the system or engine determines a set of native ad placement candidate containers, filtering may be used, for example, to narrow down the set, such as to a better, best or optimized subset. In some embodiments, a determined set of native ad placement candidate containers may effectively be an initial or preliminary set, subject to filtering.

In some embodiments, filtering can take many forms, be for many specific objectives, and utilize many different parameters and parameter ranges. For example, in some embodiments, candidate containers may be filtered based on one or more parameters associated with candidate containers or native advertisements to be associated with candidate containers, or other parameters associated with the containers, native ads, targeting, serving, context of placement, targeted users or their characteristics, etc. For example in some embodiments, filtering may be based on parameters including (1) candidate container size, (2) size of a meta-container associated with multiple candidate containers, (3) number of element types included within a candidate container, (4) anticipated display location of native advertisements associated with candidate containers, or (5) topology of the Document Object Model, among others, or combinations thereof.

For example, in some embodiments, filtering may take into account that a native ad may need to be of a particular minimum size so that its elements can be properly displayed. Alternatively, it may need to be smaller than a particular maximum size so that it can sufficiently blend in with the rest of the page, etc.

In some embodiments, meta-containers are determined. In some embodiments, filtering may be used in connection with meta-containers, such as to filter for the overall size of such metacontainers, etc.

As another example, in some embodiments, filtering may relate to minimum or maximum limits imposed on the number of particular element types (for example, hyperlinks, images, plain text elements, etc.) that may be contained in a particular native ad placement candidate container, etc.

As yet another example, filtering may relate to restrictions on the placement of native ad placement candidate containers as associated native ads may be displayed in connection with them, such as requiring that a native ad always appears on a certain portion or quadrant of the screen or display, etc., such as so that it is certain to be visible for a set of target display resolutions, etc.

As still another example, in some embodiments, filtering, or filtering parameters, may relate to DOM topology. For example, it may be desired to filter out results that correspond to DOM elements that are either the parents or ancestors of other results' DOM elements. Alternatively, it may be desired to filter out a DOM node if it is the single child of another result's DOM node, etc.

The invention claimed is:

1. A system comprising one or more processors and a non-transitory storage medium comprising program logic for execution by the one or more processors, the program logic comprising:
   a native advertisement placement engine that:
      obtains a Document Object Model of an HTML document;
      identifies Document Object Model elements, of the Document Object Model, associated with native advertisement placement candidate containers, comprising:
         identifying a secondary source HTML document associated with the HTML document, the secondary source HTML document comprising an HTML document that is at least one of an RSS feed HTML document or a mobile web page HTML document, and
         identifying, within the secondary source HTML document, content associated with native advertisement placement candidate containers of the HTML document by extracting content included in a predetermined proper subset of all tags within the secondary source HTML document;
      determining the Document Object Model elements of the Document Object Model, the Document Object Model elements comprising only elements that include the extracted content included in the predetermined proper subset of all tags within the secondary source HTML document; and based at least in part on analysis associated with the Document Object Model, and utilizing at least some of the identified elements, determines, within the Document Object Model, one or more native advertisement placement candidate containers.

2. The system of claim 1, wherein the HTML document is a Web page.

3. The system of claim 1, wherein the secondary source HTML document comprises RSS.

4. The system of claim 2, wherein the secondary source HTML document comprises a mobile web page.

5. The system of claim 1, wherein the native advertisement placement engine:
   identifies, within the Document Object Model, content of the HTML document corresponding to the identified content identified in the secondary source HTML document; and
   identifies Document Object Model elements associated with the identified content of the HTML document.

6. The system of claim 5, wherein the native advertisement placement engine:
   identifies a Document Object Model element that is a deepest ancestor including all HTML tags associated with the identified content of the HTML document.

7. The system of claim 1, wherein the identified candidate containers relate to content with which native advertisements may be associated.

8. The system of claim 2, wherein the identified candidate containers relate to locations, or relative locations relative to particular content, on the web page for native advertisement placement.

9. The system of claim 1, comprising filtering determined candidate containers based on one or more parameters associated with at least one of (1) candidate containers and (2) native advertisements to be associated with candidate containers.

10. The system of claim 1, comprising filtering determined candidate containers based on at least one of (1) candidate container size, (2) size of a meta-container associated with multiple candidate containers, (3) number of element types included within a candidate container, (4) anticipated display location of native advertisements associated with candidate containers, and (5) topology of the Document Object Model.

11. A method comprising:
   obtaining a Document Object Model of a web page;
   identifying Document Object Model elements, of the Document Object Model, associated with native advertisement placement candidate containers, comprising:
      identifying a secondary source HTML document associated with the HTML document, the secondary source HTML document comprising an HTML document that is at least one of an RSS feed HTML document or a mobile web page HTML document, and
      identifying, within the secondary source HTML document, content associated with native advertisement placement candidate containers of the HTML document by extracting content included in a predetermined proper subset of all tags within the secondary source HTML document;
   determining the Document Object Model elements of the Document Object Model, the Document Object Model elements comprising only elements that include the extracted content included in the predetermined proper subset of all tags within the secondary source HTML document; and based at least in part on analysis relating to the Document Object Model, and utilizing at least some of the identified elements, determining, within the Document Object Model, one or more native advertisement placement candidate containers.

12. The method of claim 11, wherein no user input is required.

13. The method of claim 11, wherein more than one secondary source HTML document is utilized.

14. The method of claim 11, comprising the native advertisement placement engine:
identifying, within the Document Object Model, content of the HTML document corresponding to the content identified in the secondary source HTML document; and
identifying Document Object Model elements associated with the identified content of the HTML document.

15. The method of claim 14, comprising the native advertisement placement engine:
identifying a Document Object Model element that is a deepest ancestor including all HTML tags associated with the identified content of the HTML document.

16. The method of claim 11, wherein the identified candidate containers relate to content with which native advertisements may be associated.

17. The method of claim 11, wherein the identified candidate containers relate to locations or relative locations on the web page for native advertisement placement.

18. The method of claim 11, comprising filtering determined candidate containers based on one or more parameters associated with at least one of (1) candidate containers and (2) native advertisements to be associated with candidate containers.

19. The method of claim 11, comprising filtering determined candidate containers based on at least one of (1) candidate container size, (2) size of a meta-container associated with multiple candidate containers, (3) number of element types included within a candidate container, (4) anticipated display location of native advertisements associated with candidate containers, and (5) topology of the Document Object Model.

20. A non-transitory computer readable storage medium or media tangibly storing computer program logic capable of being executed by a computer processor, the program logic comprising:
native advertisement placement engine logic for:
obtaining a Document Object Model of a web page;
identifying Document Object Model elements, of the Document Object Model, associated with native advertisement placement candidate containers, comprising:
identifying a secondary source HTML document associated with the HTML document, the secondary source HTML document comprising an HTML document that is at least one of an RSS feed HTML document or a mobile web page HTML document, and
identifying, within the secondary source HTML document, content associated with native advertisement placement candidate containers of the HTML document by extracting content included in a predetermined proper subset of all tags within the secondary source HTML document;
determining the Document Object Model elements of the Document Object Model, the Document Object Model elements comprising only elements that include the extracted content included in the predetermined proper subset of all tags within the secondary source HTML document; and
based at least in part on analysis associated with the Document Object Model, and utilizing at least some of the identified elements, determining, within the Document Object Model, one or more native advertisement placement candidate containers.

21. The method of claim 19, wherein the filtering determined candidate containers is based on a candidate container size.

22. The method of claim 19, wherein the filtering determined candidate containers is based on a size of a meta-container associated with multiple candidate containers.

23. The method of claim 19, wherein the filtering determined candidate containers is based on a number of element types included within a candidate container.

24. The method of claim 19, wherein the filtering determined candidate containers is based on an anticipated display location of native advertisements associated with candidate containers.

25. The method of claim 19, wherein the filtering determined candidate containers is based on a topology of the Document Object Model.

26. The method of claim 25, wherein the filtering determined candidate containers based on the topology of the Document Object Model comprises determining whether a first DOM element of the Document Object Model elements is an ancestor of a second DOM element of the Document Object Model elements.

27. The method of claim 25, wherein the filtering determined candidate containers based on the topology of the Document Object Model comprises determining whether a first DOM element of the Document Object Model elements is a parent of a second DOM element of the Document Object Model elements.

28. The method of claim 25, wherein the filtering determined candidate containers based on the topology of the Document Object Model comprises determining whether a first DOM element of the Document Object Model elements is a single child of a second DOM element of the Document Object Model elements.

29. The method of claim 11, comprising filtering determined candidate containers based on a set of target display resolutions.

30. The system of claim 10, wherein the filtering determined candidate containers is based on a candidate container size.

31. The system of claim 10, wherein the filtering determined candidate containers is based on a size of a meta-container associated with multiple candidate containers.

32. The system of claim 10, wherein the filtering determined candidate containers is based on a number of element types included within a candidate container.

33. The system of claim 10, wherein the filtering determined candidate containers is based on an anticipated display location of native advertisements associated with candidate containers.

34. The system of claim 10, wherein the filtering determined candidate containers is based on a topology of the Document Object Model.

35. The system of claim 34, wherein the filtering determined candidate containers based on the topology of the Document Object Model comprises determining whether a first DOM element of the Document Object Model elements is an ancestor of a second DOM element of the Document Object Model elements.

36. The system of claim 34, wherein the filtering determined candidate containers based on the topology of the Document Object Model comprises determining whether a first DOM element of the Document Object Model elements is a parent of a second DOM element of the Document Object Model elements.

37. The system of claim 34, wherein the filtering determined candidate containers based on the topology of the Document Object Model comprises determining whether a first DOM element of the Document Object Model elements is a single child of a second DOM element of the Document Object Model elements.

38. The system of claim 1, comprising filtering determined candidate containers based on a set of target display resolutions.

39. A system comprising one or more processors and a non-transitory storage medium comprising program logic for execution by the one or more processors, the program logic comprising:
  a native advertisement placement engine that:
    obtains a Document Object Model of an HTML document;
    identifies Document Object Model elements, of the Document Object Model, associated with native advertisement placement candidate containers, comprising:
      identifying a secondary source HTML document corresponding with the HTML document, the secondary source HTML document comprising an HTML document that is at least one of an RSS feed HTML document or a mobile web page HTML document, and
      identifying, within the secondary source HTML document, content corresponding with native advertisement placement candidate containers of the HTML document by extracting content included in a predetermined proper subset of all tags within the secondary source HTML document;
      determining the Document Object Model elements of the Document Object Model, the Document Object Model elements comprising only elements that include the extracted content included in the predetermined proper subset of all tags within the secondary source HTML document; and
    based at least in part on analysis associated with the Document Object Model, and utilizing at least some of the identified elements, determines, within the Document Object Model, one or more native advertisement placement candidate containers.

40. A system comprising one or more processors and a non-transitory storage medium comprising program logic for execution by the one or more processors, the program logic comprising:
  a native advertisement placement engine that:
    obtains a Document Object Model of an HTML document;
    identifies Document Object Model elements, of the Document Object Model, associated with native advertisement placement candidate containers, comprising:
      identifying a secondary source HTML document corresponding with the HTML document; and
      identifying, within the secondary source HTML document, content corresponding with native advertisement placement candidate containers of the HTML document by extracting content included in a predetermined proper subset of all tags within the secondary source HTML document;
      determining the Document Object Model elements of the Document Object Model, the Document Object Model elements comprising only elements that include the extracted content included in the predetermined proper subset of all tags within the secondary source HTML document; and
    based at least in part on analysis associated with the Document Object Model, and utilizing at least some of the identified elements, determines, within the Document Object Model, one or more native advertisement placement candidate containers.

* * * * *